United States Patent
Ishiguro et al.

(10) Patent No.: US 7,539,173 B2
(45) Date of Patent: May 26, 2009

(54) RADIO COMMUNICATION SYSTEM, RADIO TERMINAL, BASE STATION, CONTROL EQUIPMENT AND COMMUNICATION METHOD

(75) Inventors: Takayuki Ishiguro, Yokosuka (JP); Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 847 days.

(21) Appl. No.: 10/443,776

(22) Filed: May 23, 2003

(65) Prior Publication Data

US 2004/0014477 A1 Jan. 22, 2004

(30) Foreign Application Priority Data

May 23, 2002 (JP) ............................. P2002-149674

(51) Int. Cl.
 *H04B 7/212* (2006.01)
 *H04J 3/00* (2006.01)
(52) U.S. Cl. ..................... 370/348; 370/337; 370/443; 455/436
(58) Field of Classification Search .................. 370/348
 See application file for complete search history.

(56) References Cited

U.S. PATENT DOCUMENTS

| | | | |
|---|---|---|---|
| 5,940,380 A | 8/1999 | Poon et al. | |
| 6,044,086 A | 3/2000 | Albrow et al. | |
| 6,497,599 B1 * | 12/2002 | Johnson et al. | 455/447 |
| 6,650,691 B2 * | 11/2003 | Cramer, III | 375/146 |
| 7,088,688 B2 * | 8/2006 | Kim et al. | 370/280 |
| 7,149,204 B2 * | 12/2006 | Shoji et al. | 370/337 |
| 2001/0008521 A1 | 7/2001 | Virtanen | |
| 2002/0150074 A1 * | 10/2002 | Hayashi et al. | 370/342 |
| 2002/0160716 A1 * | 10/2002 | Hiramatsu et al. | 455/67.1 |

FOREIGN PATENT DOCUMENTS

CN  1160463  9/1997

(Continued)

OTHER PUBLICATIONS

Martin Haardt, et al., "The TD-CDMA Based UTRA TDD Mode", IEEE Journal on Selected Areas in Communications, vol. 18, No. 8, XP-001004405, Aug. 2000, pp. 1375-1385.

(Continued)

*Primary Examiner*—Lester Kincaid
*Assistant Examiner*—Matthew Sams
(74) *Attorney, Agent, or Firm*—Oblon, Spivak, McClelland, Maier & Neustadt, P.C.

(57) ABSTRACT

A radio communication system comprises a radio terminal and a plurality of base stations. The base stations communicate with the radio terminal by connecting radio links with mutually different frequencies. The base stations comprise a control signal transmitter configured to transmit control signals in a plurality of control signal time slots included in one frame. The radio terminal comprises a reception time slot determining unit configured to determine reception time slots for receiving the control signals transmitted from the plurality of base stations, from among the plurality of control signal time slots, a control signal receiver configured to receive the control signals in the reception time slots determined by the reception time slot determining unit, and a communication signal transmitter configured to transmit communication signal to the base station in an uplink communication signal time slot other than the control signal time slots.

14 Claims, 6 Drawing Sheets

FOREIGN PATENT DOCUMENTS

| | | |
|---|---|---|
| EP | 0 853 439 | 7/1998 |
| JP | 6-244791 | 9/1994 |
| JP | 2000-232457 | 8/2000 |
| JP | 2000-232675 | 8/2000 |
| JP | 2000-312377 | 11/2000 |
| JP | 2001-028775 | 1/2001 |

OTHER PUBLICATIONS

Werner Möhr, "The Utra Concept, Europe's Proposal to IMT-2000", Global Telecommunications Conference—Globecom'99, XP-010373437, Dec. 5, 1999, pp. 2683-2688.

* cited by examiner

RADIO COMMUNICATION SYSTEM, RADIO TERMINAL, BASE STATION, CONTROL EQUIPMENT AND COMMUNICATION METHOD

CROSS REFERENCE TO RELATED APPLICATIONS

This application is based upon and claims the benefit of priority from the prior Japanese Patent Application No. P2002-149674, filed on May 23, 2002; the entire contents of which are incorporated herein by reference.

BACKGROUND OF THE INVENTION

1. Field of the Invention

The present invention relates to a radio communication system, which includes a radio terminal and a plurality of base stations. In the radio communication system, the base stations communicate with the radio terminal by connecting radio links with mutually different frequencies between base stations, and relates to the radio terminal, the base stations, control equipment and a communication method, which are used in the radio communication system.

2. Description of the Related Art

In recent years, there has been an increase in demand for high-speed data communications in the field of radio communications such as portable telephone communications. Thus, an International Mobile Telecommunication-2000 (IMT-2000) system has been introduced to enable high-speed communications with a maximum communication speed of 2 Mbps. In the IMT-2000 system, an IMT-2000/Time Division Duplex (TDD) has been standardized. In the IMT-2000/TDD, a length of one frame is 10 ms. This one frame is divided into fifteen time slots. Each time slot is assigned to an uplink time slot used for uplink communication from a radio terminal to a base station, or to a downlink time slot used for downlink communication from the base station to the radio terminal. Accordingly, in the IMT-2000/TDD, a ratio of uplink traffic to downlink traffic can be freely changed by controlling this time slot assignment. Moreover, the IMT-2000 system adopts Code Division Multiple Access (CDMA) to enable transmission/reception of a plurality of signals in the same time slot.

In the radio communication system which uses such an IMT-2000/TDD, as shown in FIGS. 1 and 2, a radio terminal 210 and base stations 220, 230 communicate by constituting one frame of fifteen time slots numbered 1 to 15 and assigning the time slots to uplink and downlink time slots. In FIGS. 1 and 2, an abscissa indicates a time axis. The drawings show transmission/reception of signals carried out by the radio terminal 210 and the base stations 220, 230 in relation to the time axis.

In FIG. 1, first, the base station 220 transmits a control signal A310 in a time slot No. 1 of a frame No. 1. In the same time slot No. 1 of the frame No. 1, the base station 230 transmits a control signal B311 with a frequency different from that used by the base station 220. Thus, in FIG. 1, the base stations 220, 230 both transmit control signals in the time slot No. 1 of each frame. Therefore, the time slots for transmitting the control signals are synchronized.

At this time, the radio terminal 210 receives the control signal A310 from the base station 220, which is in communication with the radio terminal 210. Then, in a time slot No. 5 of the frame No. 1, the radio terminal 210 transmits a communication signal C320 including data to the base station 220. The radio terminal 210 determines transmission power for transmitting the communication signal C320 based on the reception power of the control signal A310 received in the time slot No. 1. Then, the base station 220 transmits a communication signal D330 to the radio terminal 210 in a time slot No. 7 of the frame No. 1.

Subsequently, in a time slot No. 1 of a frame No. 2, the base station 220 transmits the control signal A310, and the base station 230 transmits the control signal B311. At this time, the radio 210 carries out a handover, if the radio terminal 210 has moved from a cell covered by the base station 220 to a cell covered by the base station 230. Specifically, if a quality of a radio link deteriorates while the radio terminal 210 is communicating with the base station 220 by connecting the radio link, the radio terminal 210 carries out the handover, which comprises switching from the radio link with the base station 220 to a radio link with the other base station 230. Thus, the radio terminal 210 receives the control signal B311 from the base station 230.

In FIG. 2, first, the base station 220 transmits the control signal A310 in the time slot No. 1 of the frame No. 1. At this time, the radio terminal 210 receives the control signal A310 from the base station 220, which is in communication with the radio terminal 210. Then, in the time slot No. 5 of the frame No. 1, the radio terminal 210 transmits the communication signal C320 including data to the base station 220. The radio terminal 210 determines the transmission power for transmitting the communication signal C320 based on the reception power of the control signal A310 received in the time slot No. 1.

Then, in the time slot No. 7 of the frame No. 1, the base station 230 transmits the control signal B311 with a frequency different from that used by the base station 220. In the same time slot No. 7 of the frame No. 1, the base station 220 transmits the communication signal D330 to the radio terminal 210. Thus, in FIG. 2, the base stations 220, 230 transmit the control signals in the different time slots of each frame. At this time, the radio terminal 210 receives the communication signal D330 from the base station 220, which is in communication with the radio terminal 210.

Subsequently, similarly, in the time slot No. 1 of the frame No. 2, the base station 220 transmits the control signal A310. In the time slot No. 5 of the frame No. 2, the radio terminal 210 transmits the communication signal C320. Then, in a time slot No. 7 of the frame No. 2, the base station 230 transmits the control signal B311 to the radio terminal 210, and the base station 220 transmits the communication signal D330 to the radio terminal 210. At this time, if the radio terminal 210 has moved to the cell covered by the base station 230, the base station 230 becomes the base station to which the radio terminal 210 connects a new radio link according to the handover. Thus, the radio terminal 210 receives the control signal B311 from the base station 230.

However, in the case of the conventional communication method where the plurality of base stations 220, 230 transmit the control signals in the same time slot of each frame as shown in FIG. 1, there are the following problems. Before the execution of the handover, the radio terminal 210 receives the control signal B311 transmitted from the base station 230 as a handover destination, where the new radio link is connected, and measures the quality of the control signal. On the other hand, the radio terminal 210 determines the transmission power for transmitting the communication signal C320 based on the reception power of the control signal A310 received from the base station 220, which is in communication with the radio terminal 210 and controls the transmission power.

However, as in the frame No. 1, when the radio terminal 210 receives the control signal A310 from the base station 220, which is in communication with the radio terminal 210, the radio terminal 210 cannot receive the control signal B311 from a base station other than the base station 220, which is in communication with the radio terminal 210, i.e., the base station 230. Therefore the radio terminal 210 cannot receive the control signal, which is necessary for the handover. On the other hand, when the radio terminal 210 receives the control signal B311 from a base station other than the base station 220, which is in communication with the radio terminal 210, i.e., the base station 230, the radio terminal 210 cannot receive the control signal A310 from the base station 220, which is in communication with the radio terminal 210. Accordingly, the radio terminal 210 cannot control the transmission power when the radio terminal 210 transmits the communication signal C320, and communication capacity is reduced. Therefore, it is impossible to satisfactorily communicate.

Further, in the case of the conventional communication method where the plurality of base stations 220, 230 transmit the control signals in the different time slots of each frame as shown in FIG. 2, there are the following problems. As in the time slot No. 7 of the frame No. 1, when the radio terminal 210 receives the control signal D330 from the base station 220, which is in communication with the radio terminal 210, the radio terminal 210 cannot receive the control signal B311 from a base station other than the base station 220, which is in communication with the radio terminal 210, i.e., the base station 230. Therefore, the radio terminal 210 cannot receive the control signal necessary for the handover.

On the other hand, when the radio terminal 210 receives the control signal B311 transmitted from the base station 230 in the same time slot for the communication signal C320 from the radio terminal 210 to the base station 220 which are in communication with the radio terminal 210, the radio terminal 210 cannot transmit the communication signal C320 to the base station 220, which is in communication with the radio terminal 210. When the radio terminal 210 receives the control signal B311 transmitted from the base station 230 in the same time slot as that used for transmission/reception of the communication signal D330, the radio terminal 210 cannot receive the communication signal D330 from the base station 220, which is in communication with the radio terminal 210. Therefore, it is impossible to satisfactorily communicate between the radio terminal 210 and the base station 220 which are in communication with each other.

BRIEF SUMMARY OF THE INVENTION

An object of the present invention is to enable satisfactory communication between a radio terminal and a base station, which are in communication, and to enable the radio terminal to receive a control signal from a base station other than the base station which is in communication with the radio terminal.

A radio communication system comprises a radio terminal and a plurality of base stations. In the communication system, the base stations communicate with the radio terminal by connecting radio links with mutually different frequencies. Each of the plurality of base stations comprises a control signal transmitter configured to transmit control signals in a plurality of control signal time slots included in one frame. The radio terminal comprises a reception time slot determining unit configured to determine reception time slots for receiving the control signals transmitted from the plurality of base stations, from among the plurality of control signal time slots, a control signal receiver configured to receive the control signals in the reception time slots determined by the reception time slot determining unit, and a communication signal transmitter configured to transmit communication signal including data to the base station in an uplink communication signal time slot other than the control signal time slots.

Hereinafter, a time slot for transmitting the control signal is referred to as a "control signal time slot", a time slot for receiving the control signal determined from among the plurality of control signal time slots is referred to as a "reception time slot", and a signal including data is referred to as a "communication signal". Further, a time slot for transmitting/receiving the communication signal between the base station and the radio terminal is referred to as a "communication signal time slot". Especially, a communication signal time slot for transmitting the communication signal from the radio terminal to the base station is referred to as a "uplink communication signal time slot", and a communication signal time slot for transmitting the communication signal from the base station to the radio terminal is referred to as a "downlink communication signal time slot".

According to such the radio communication system, the control signal transmitter transmits the control signals in the plurality of control signal time slots included in one frame. The reception time slot determining unit determines the reception time slots from among the plurality of control signal time slots. The control signal receiver receives the control signals in the determined reception time slots. Further, the communication signal transmitter transmits the communication signal to the base station in the uplink communication signal time slots other than the control signal time slots.

Thus, the control signals are transmitted a plurality of times in one frame from the plurality of base stations. The radio terminal can select the reception time slots for receiving the control signals from among them. Therefore, the radio terminal can receive the control signals from the base stations. Further, the radio terminal can transmit the communication signals in the uplink communication signal time slots other than the control signal time slots.

Thus, the radio terminal can receive the control signal, which is necessary for the handover, from a base station other than the base station, which is in communication with the radio terminal. Further, the radio terminal can also control transmission power by receiving the control signal, which is necessary for transmission power control, from the base station which is in communication with the radio terminal. The radio terminal can transmit the communication signals to the base stations. Thus, the radio terminal and the base station can satisfactorily communicate with each other.

A control equipment comprises a transmission time slot determining unit configured to determine a plurality of control signal time slots included in one frame for transmitting control signals, from a plurality of base stations, and a base station controller configured to control transmission of the control signals by the plurality of base stations, based on a determined result by the transmission time slot determining unit.

According to such the control equipment, the transmission time slot determining unit determines the control signal time slots. Therefore, the base stations can transmit the control signals in the control signal time slots determined by the transmission time slot determining unit. Thus, the base stations can transmit the control signals by changing the transmission timing in accordance with a communication situation at the time.

Another control equipment comprises an assignment unit configured to preferentially assign a time slot, other than a control signal time slot of a not-in-communication base station, which is used for transmitting a control signal of the not-in-communication base station, to a communication signal time slot in which a radio terminal transmits/receives a communication signal to/from the base station.

Hereinafter, the control signal from the base station with which the radio terminal is in communication, in other words, the base station to/from which the radio terminal transmits/receives the control signal by connecting the radio link is particularly referred to as a "control signal of a in-communication base station", and the time slot for transmitting the control signal of the in-communication base station is referred to as a "control signal time slot of the in-communication base station". Conversely, the control signal from the base station with which the radio terminal is not in communication, in other words, the base station which the radio terminal does not connect radio link to, and does not transmit/receive communication signal to/from, is referred to as a "control signal of the not-in-communication base station", and the time slot for transmitting the control signal of the not-in-communication base station is referred to as a "control signal time slot of the not-in-communication base station".

According to such the control equipment, the assignment unit can preferentially assign the time slot other than the control signal time slot of the not-in-communication base station, to the communication signal time slot. Thus, the control equipment can prevent the assignment of the control signal time slot of not-in-communication base station to the communication signal time slot as much as possible. Therefore, the control equipment can save the control signal time slot of the not-in-communication base station for transmitting the control signal of the not-in-communication base station. As a result, the radio terminal can receive the control signal, which is necessary for the handover, from the base station, which is not in communication with the radio terminal. Moreover, the radio terminal and the base station, which are in communication can transmit/receive the communication signal in the communication signal time slot other than the control signal time slots of the not-in-communication base station. Thus, the radio terminal and the base station can satisfactorily communicate.

DETAILED DESCRIPTION OF THE INVENTION

First Embodiment

[Radio Communication System]

Figure 1:
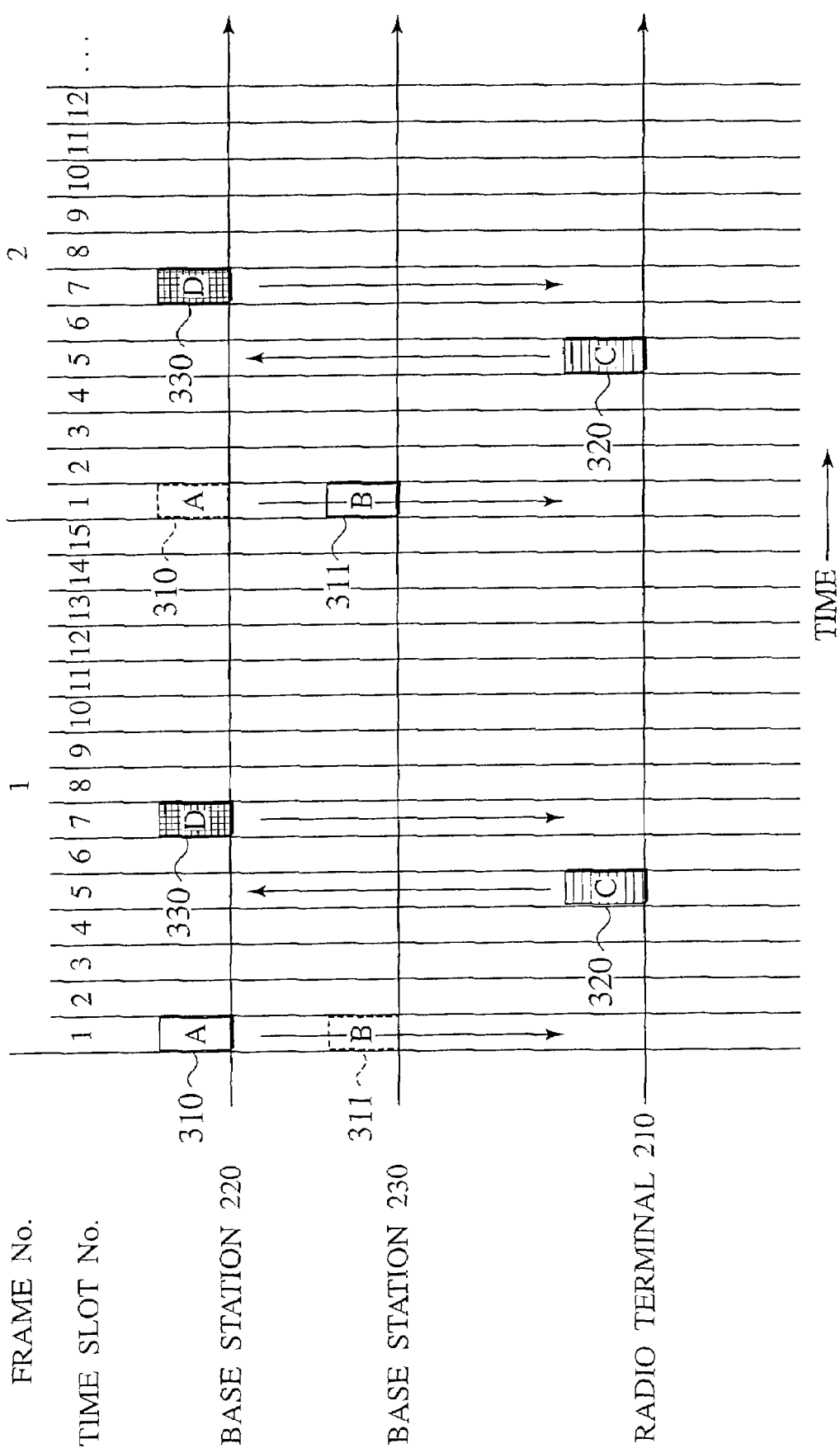
FIG. 1 is a diagram explaining a conventional communication method.
Figure 2:
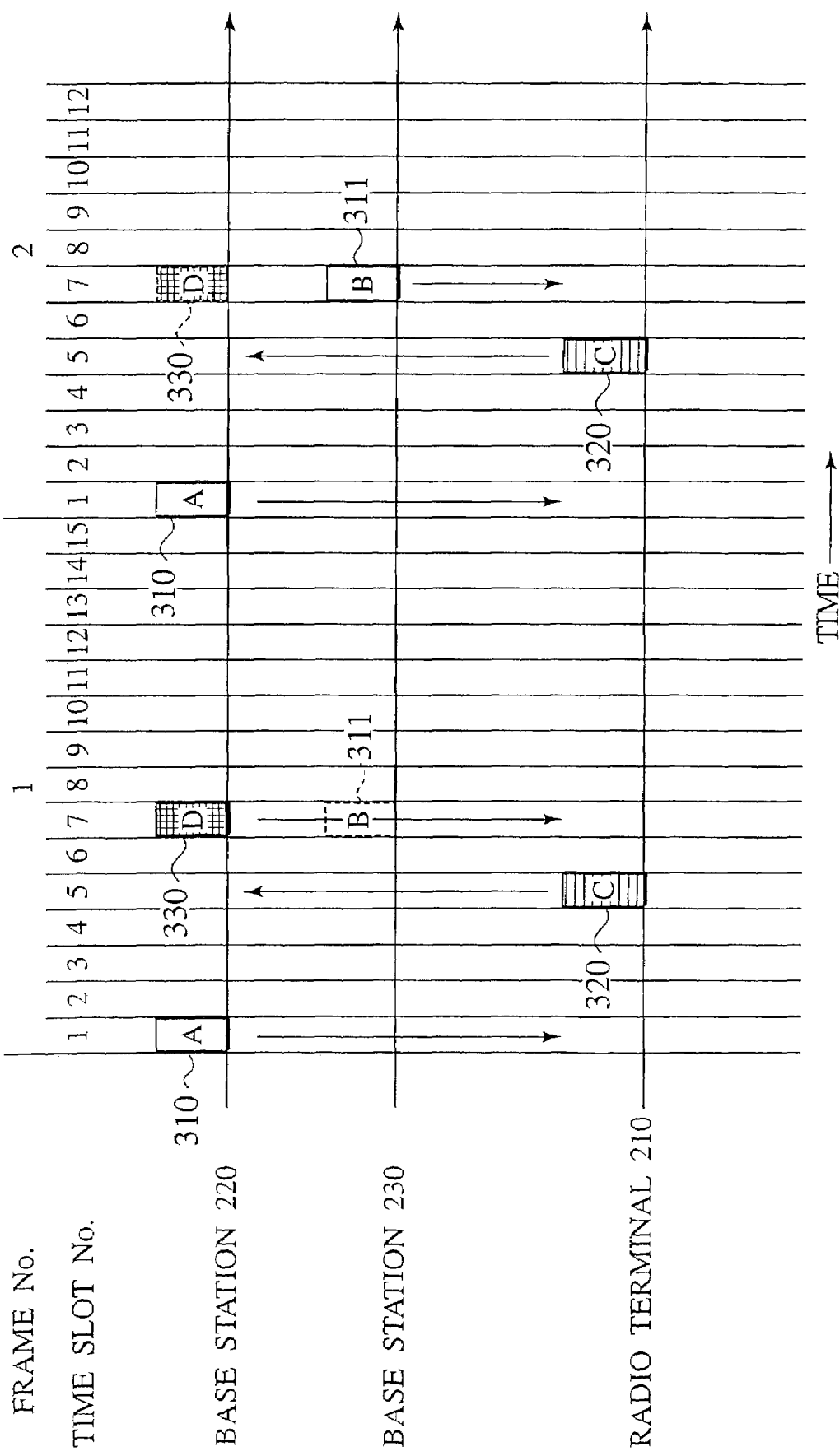
FIG. 2 is a diagram explaining another conventional communication method.
Figure 3:
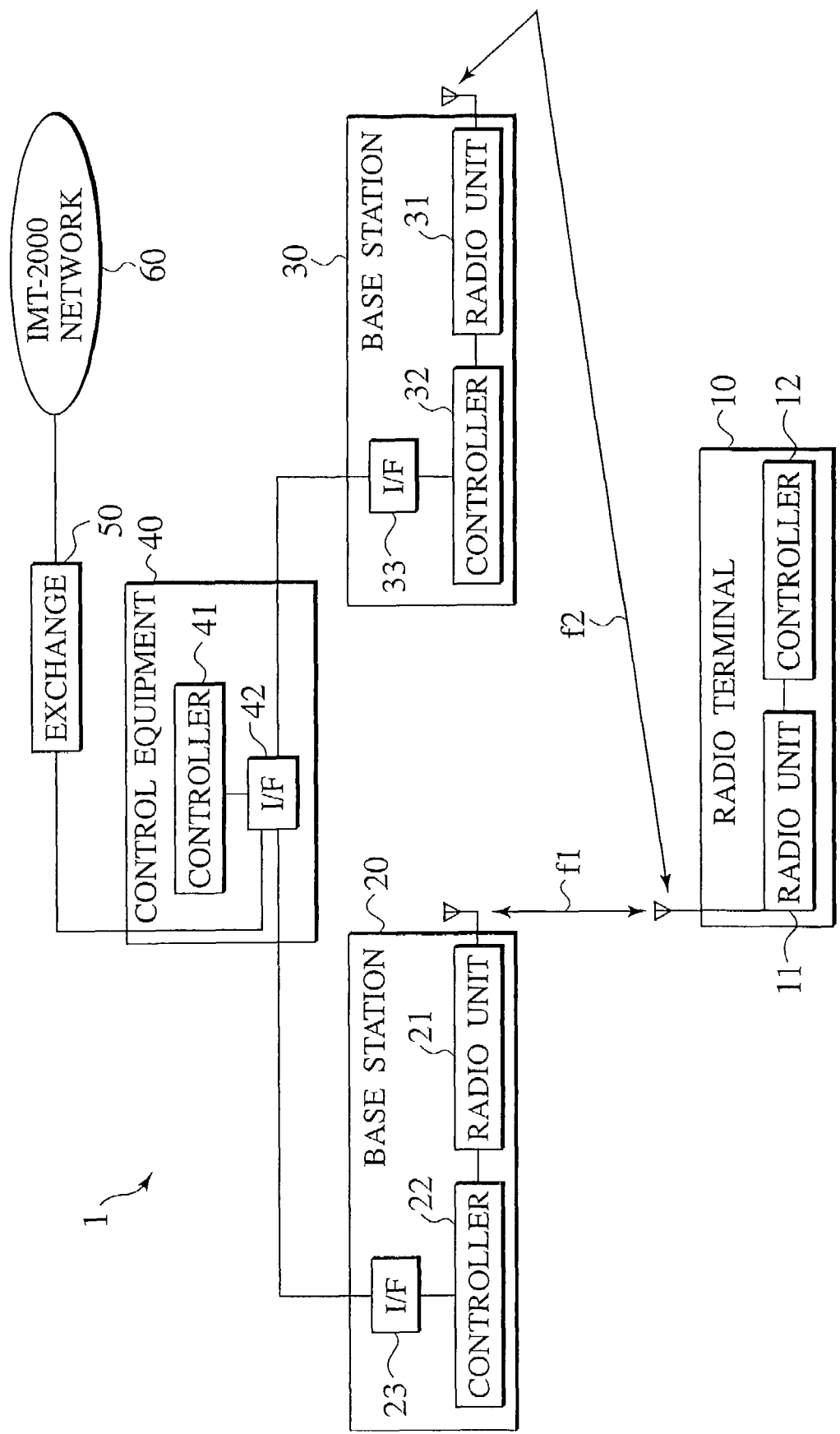
FIG. 3 is a diagram showing a configuration of a radio communication system according to a first embodiment of the present invention.

As shown in FIG. 3, a radio communication system 1 comprises a radio terminal 10, a plurality of base stations 20, 30, a control equipment 40, an exchange 50, and an IMT-2000 network 60. The radio communication system 1 is an IMT-2000 system.

The radio terminal 10 communicates with the base stations 20, 30 connecting radio links. The radio terminal 10 communicates with the base stations 20, 30 connecting the radio links with different frequencies between the base stations 20, 30. The radio terminal 10 connects the radio link with the base station 20 with a frequency $f_1$. The radio terminal 10 connects the radio link with the base station 30 with a frequency $f_2$. If quality of the radio link connected to the base station 20 deteriorates while the radio terminal 10 is communicating with the base station 20, the radio terminal 10 carries out a handover, which comprises switching the radio link with the base station 20 to the radio link with the base station 30. Conversely, if the quality of the radio link connected to the base station 30 deteriorates while the radio terminal is communicating with the base station 30, the radio terminal 10 carries out a handover, which comprises switching the radio link with the base station 30 to the radio link with the base station 20.

The radio terminal 10 comprises a radio unit 11 and a controller 12. The radio unit 11 connects the radio links to the base stations 20, 30 based on control of the controller 12, and transmits/receives communication signals. The radio unit 11 transmits/receives the communication signal to/from one of the plurality of base stations 20, 30 with one of the frequencies $f_1$, $f_2$. Thus, the radio unit 11 functions as a communication signal transmitter configured to transmit the communication signal to the base stations 20, 30. Further, the radio unit 11 receives control signals from the base stations 20, 30 based on the control of the controller 12. This radio unit 11 also functions as a control signal receiver configured to receive the control signals. Additionally, based on the control of the controller 12, the radio unit 11 carries out the handover switching the base station with which the radio terminal connects the radio link between the base stations 20, 30.

The controller 12 controls the radio unit 11. The controller 12 functions as a time slot determining unit configured to determine reception time slots for receiving the control signals transmitted from the plurality of base stations 20, 30, from among a plurality of control signal time slots. Then, the controller 12 instructs the radio unit 11 to receive the control signals in the determined reception time slots. Thus, the controller 12 controls the radio unit 11. The controller 12 obtains control information regarding uplink communication signal time slots assigned to the radio terminal 10 from the control signals which the radio terminal 10 receives from the base stations 20, 30. Then, the controller 12 instructs the radio unit 11 to transmit the communication signals to the base stations 20, 30 in the uplink communication signal time slots assigned to the radio terminal 10. Thus, the controller 12 controls the radio unit 11. When the radio terminal 10 transmits this communication signal, the controller 12 controls transmission power. The controller 12 determines transmission power for transmitting the communication signal based on reception power when the radio unit 11 receives the control signal. By this transmission power control, the transmission power for transmitting the communication signal from the radio unit 11 to the base stations 20, 30 can be optimized to increase communication capacity.

Further, the controller 12 also controls the handover. The controller 12 obtains the qualities of the control signals, which the radio unit 11 receives from the base stations 20, 30, from the radio unit 11. Then, the controller 12 instructs the radio unit 11 to transmit control information regarding the qualities of the received control signals together with data, as the communication signals to the base stations 20, 30. The radio unit 11 receives the control signals including instructions regarding the handover transmitted from the control equipment 40 in response to the transmitted control information, from the base stations 20, 30. The controller 12 obtains the instruction regarding the handover from the control signals. Then, in accordance with the instruction regarding the handover, the controller 12 instructs the radio unit 11 to connect a new radio link.

The base stations 20, 30 communicate with the radio terminals 10 by connecting the radio link. The base stations 20, 30 set the radio links with the radio terminal 10 with frequencies different therebetween. Specifically, the plurality of base stations 20, 30 communicate with the radio terminal 10 by connecting the radio links with mutually different frequencies. The base station 20 connects the radio link with the frequency $f_1$. The base station 30 connects the radio link with the frequency $f_2$. The base stations 20, 30 are connected with the control equipment 40. The base stations 20, 30 transmit the communication signals and the control signals to the radio terminal 10 based on the control of the control equipment 40.

The base stations 20, 30 include radio units 21, 31, controllers 22, 32, and interfaces 23, 33, respectively. The radio units 21, 31 connect the radio links to the radio terminal 10 based on the controls of the controller 22, 32, and transmit/receive the communication signals. The radio units 21, 31 function as control signal transmitters configured to transmit the control signals to the radio terminal 10 in the plurality of control signal time slots included in one frame based on controls of the controllers 22, 32. The radio units 21, 31 respectively use the frequencies $f_1$, $f_2$ to transmit the control signals and to transmit/receive the communication signals.

The interfaces 23, 33 are connected with the control equipment 40. The interfaces 23, 33 receive the control information and data from the control equipment 40 and input the received control information and data to the controllers 22, 32.

The interfaces 23, 33 transmit the control information from the controllers 22, 32 and data to the control equipment 40.

The controllers 22, 32 control the radio units 21, 31, respectively. The controllers 22, 32 obtain the control information regarding the control signal time slots, which the control equipment 40 assigns to the base stations 20, 30 from the control equipment 40 through the interfaces 23, 33. Then, the controllers 22, 32 instruct the radio units 21, 31 to transmit the control signals to the radio terminal 10 in the assigned control signal time slots. Thus, the controllers 22,32 control the radio units 21, 31. The plurality of time slots included in one frame are assigned to the base stations 20, 30 as the control signal time slots by the control equipment 40.

The control signals for transmitting to the radio terminal 10 included the control information regarding the uplink communication signal time slot which the control equipment 40 assigns to the radio terminal 10, the instruction regarding the handover to the radio terminal 10, and the control information regarding the control signal time slots assigned to the base stations 20, 30.

The controllers 22, 32 obtain control information regarding downlink communication signal time slots, which the control equipment 40 assigns to the base stations 20, 30, from the control equipment 40 through the interfaces 22, 32. Then, the controllers 22, 32 instruct the radio units 21, 31 to transmit the communication signals to the radio terminal 10 in the assigned downlink communication signal time slots. Thus, the controllers 22, 32 control the radio units 21, 31. The controllers 22, 32 obtain data and control information regarding the reception qualities of the control signals included in the communication signals which the radio unit 21, 31 receive from the radio terminal 10. The controllers 22, 32 transmit the data and the control information regarding the reception qualities of the control signals to the control equipment 40 through the interfaces 23, 33.

The control equipment 40 controls communications between the radio terminal 10 and the base stations 20, 30. The control equipment 40 is connected to the base stations 20, 30 and controls them. The control equipment 40 controls the radio terminal 10 through the base stations 20, 30. The control equipment 40 is also connected to the exchange 50. The control equipment 40 transmits the data received from the radio terminal 10 through the base stations 20, 30 to the exchange 50. The control equipment 40 receives data to the radio terminal 10 from the exchange 50, and transmits the data to the base stations 20, 30.

The control equipment 40 comprises a controller 41 and an interface 42. The interface 42 is connected to the base stations 20, 30. The interface 42 transmits the control information and data from the controller 41 to the base stations 20, 30. The interface 42 receives the data and the control information from the base stations 20, 30, and inputs the received data and control information to the controller 41. The interface 42 is also connected to the exchange 50. The interface 42 transmits data received from the radio terminal 10 through the base stations 20, 30 to the exchange 50, in accordance with the instruction from the controller 41. Additionally, the interface 42 receives data to the radio terminal 10 from the exchange 50 and transmits the data to the base stations 20, 30 in accordance with the instructions from the controller 41.

The controller 41 controls the base stations 20, 30 through the interface 42. The controller 41 functions as a transmission time slot determining unit configured to determine a plurality of control signal time slots included in one frame for transmitting the control signals, from the base stations 20, 30. Then, the controller 41 controls the transmission of the control signals by the base stations 20, 30, by transmitting the control information regarding the determined control signal time slots, through the interface 42 to the base stations 20, 30. Thus, the controller 41 functions as a base station controller configured to control the transmission of the control signals by the base stations 20, 30, based on a determined result about the control signal time slots as well.

The controller 41 assigns the downlink communication signal time slots to the base stations 20, 30. The controller 41 assigns the uplink communication signal time slots to the radio terminal 10. The controller 41 assigns the downlink and uplink communication signal time slots so that the downlink and uplink communication signal time slots are different from each other. Then, the controller 41 controls the transmission of the communication signals by the base stations 20, 30, by transmitting the control information regarding the downlink communication signal time slots through the interface 42 to the base stations 20, 30. The controller 41 controls the transmission of the communication signals by the radio terminal 10 in the uplink communication signal time slot, by transmitting the control information regarding the uplink communication signal time slots through the interface 42 to the base stations 20, 30, and instructing the base stations 20, 30 to transmit the information to the radio terminal 10.

The controller 41 controls the handover of the radio terminal 10. Specifically, the controller 41 obtains the control information regarding the reception qualities of the control signals from the radio terminal 10, from the base stations 20, 30 through the interface 42. If the reception qualities of the control signals decline, the controller 41 determines that it is necessary to carry out the handover. On the other hand, if the reception qualities of the control signals are good, the controller 41 determines that it is not necessary to carry out the handover. Then, when the controller 41 determines that the handover is necessary, the controller 41 transmits the control information regarding the instruction of the handover to the radio terminal 10, through the interface 42 to the base stations 20, 30, and instructs the base stations 20, 30 to transmit control information to the radio terminal 10.

The controller 41 instructs the interface 42 to transmit received data from the radio terminal 10, through the base stations 20, 30 to the exchange 50. The controller 41 instructs the interface 42 to transmit data to the radio terminal 10, which the interface 42 receives from the exchange 50, to the base stations 20, 30.

The exchange 50 connects to the controller 40 and the IMT-2000 network 60. The exchange 50 receives data destined for the radio terminal 10 under its control, through the IMT-2000 network 60, and transmits the received data to the controller 40. The exchange 50 receives data from the controller 40 transmitted by the radio terminal 10. The exchange 50 transmits the received data to another exchange 50 through the IMT-2000 network.

The IMT-2000 network 60 is a mobile communication network based on a standardized IMT-2000. A plurality of the exchanges 50 are connected to the IMT-2000 network 60. The IMT-2000 network 60 transfers data transmitted from the exchange 50 to another exchange 50 controlling the radio terminal 10, which is a destination of the data.

[Communication Method]

Figure 4:
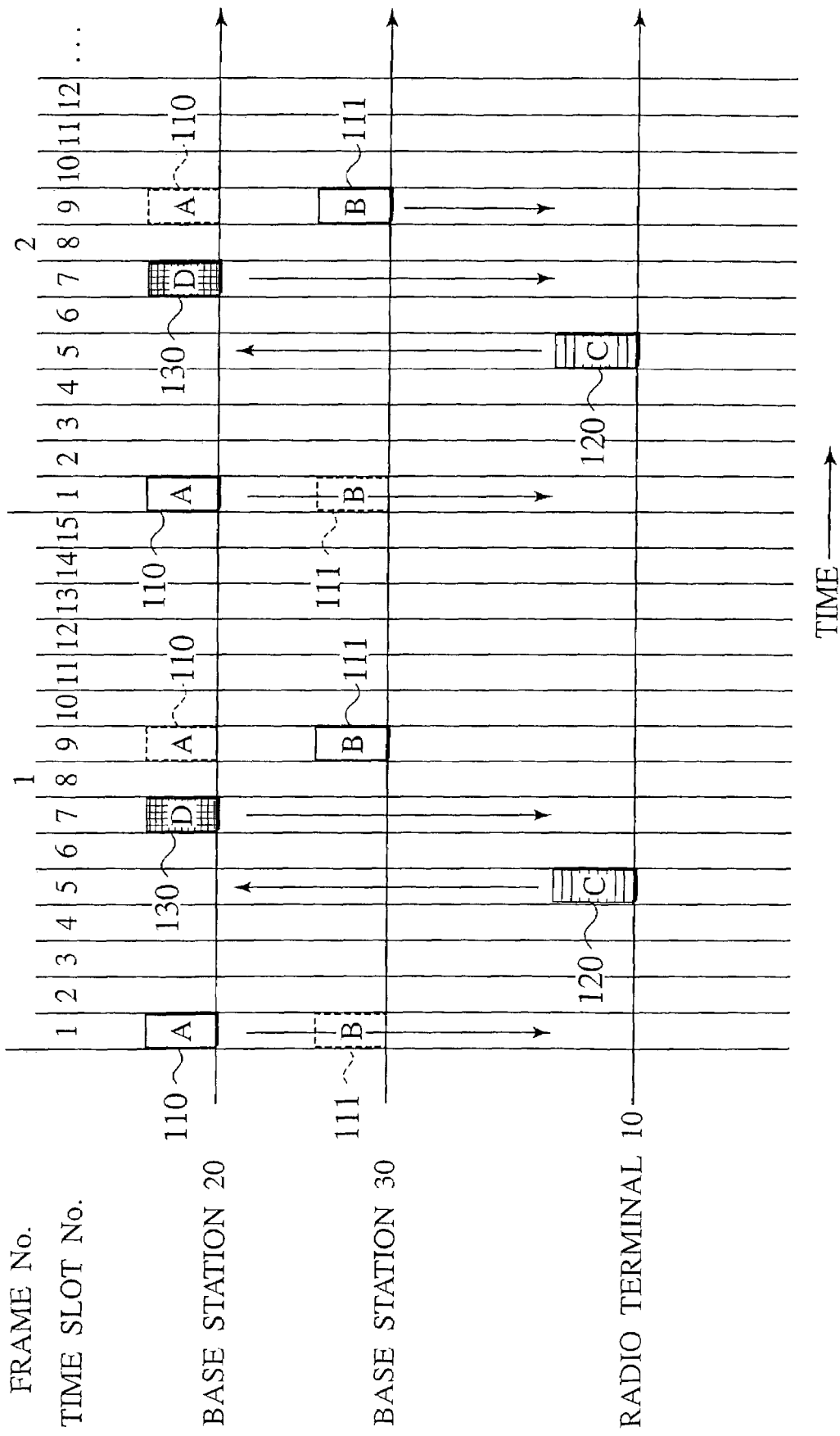
FIG. 4 is a diagram explaining a communication method according to the first embodiment of the present invention.

Next, a communication method using the radio communication system 1 is described. In FIG. 4, an abscissa indicates a time axis. The drawing shows transmission/reception of the communication signals and the control signals between the radio terminal 10 and the base stations 20, 30, in relation to the time axis. One frame is divided into fifteen time slots. A length of one frame is 10 ms. The time slots can be assigned to transmission of the uplink communication signals, and transmission of the downlink communication signals and control signals. The frames are given sequential numbers from 1 according to the passage of time. The time slots are given sequential numbers from 1 to 15 according to the passage of time.

In FIG. 4, the radio terminal 10 connects a radio link to communicate with the base station 20. First, the base station 20 transmits a control signal A110 in a time slot No. 1 of a frame No. 1 with a frequency $f_1$. In the same time slot No. 1 of the frame No. 1, the base station 30 transmits a control signal B111 with a frequency $f_2$. At this time, the radio terminal 10 receives the control signal A110 from the base station 20, which is in communication with the radio terminal 10. Hereinafter, the control signal transmitted by the base station 20 is referred to as a "control signal A", and the control signal transmitted by the base station 30 is referred to as a "control signal B".

Then, in a time slot No. 5 of the frame No. 1, the radio terminal 10 transmits a communication signal C120 including data to the base station 20. The radio terminal 10 determines transmission power for transmitting the communication signal C120 based on reception power of the control signal A110 received in the time slot No. 1. Then, the base station 20 transmits a communication signal D130 to the radio terminal 10 in a time slot No. 7 of the frame No. 1. Hereinafter, the communication signal transmitted by the radio terminal 10 is referred to as a "communication signal C", and the communication signal transmitted by the base station 20 is referred to as a "communication signal D".

Then, in a time slot No. 9 of the frame No. 1, the base station 20 transmits the control signal A110 with the frequency $f_1$. In the same time slot No. 9 of the frame No. 1, the base station 30 transmits the control signal B111 with the frequency $f_2$. At this time, the radio terminal 10 receives the control signal B111 from the base station 30, which is not in communication with the radio terminal 10. In the frame No. 2, transmission/reception of the control signals and the communication signals is carried out similar to the case of the frame 1.

Thus, the base stations 20, 30 transmit the control signals in the same time slots No. 1 and No. 9 of each frame, and the time slots for transmitting the control signals are synchronized. The base stations 20, 30 transmit the control signals A and B in the two control signal time slots, i.e., the time slot No. 1 and No. 9, included in one frame.

[Transmission/Reception of Signal]

Next, transmission/reception of each signal is described.

(Transmission of Control Signal)

The controller 41 of the control equipment 40 determines two time slots included in one frame as the control signal time slots, so that each of the base stations 20, 30 can transmit the control signal twice in one frame. Further, the controller 41 determines the control signal time slot so that the base stations 20, 30 can transmit the control signals in the same time slot.

In FIG. 4, the controller 41 determines the time slots No. 1 and No. 9 in each frame as the control signal time slots. The controller 41 instructs the transmission of the control signals with the time slots No. 1 and No. 9 by transmitting the control information instructing the use of the time slots No. 1 and No. 9 as the control signal time slots, through the interface 42 to the base stations 20, 30.

The interfaces 23, 33 of the base stations 20, 30 receive the control information, and input the information to the controllers 22, 32. The controllers 22, 32 obtain information that the time slots No. 1 and No. 9 have been assigned as the control signal time slots, from the control information. The controllers 22, 32 instruct the radio units 21, 31 to transmit the control signals to the radio terminal 10 in the time slots Nos. 1 and 9.

Then, the radio unit 21 transmits the control signal A110 to the radio terminal 10 in a plurality of control signal time slots included in one frame, i.e., the time slots No. 1 and No. 9 of each frame, with the frequency $f_1$. The radio unit 31 transmits the control signal B111 to the radio terminal 10 in a plurality of control signal time slots included in one frame, i.e., the time slots No. 1 and No. 9 of each frame, with the frequency $f_2$. The controllers 22, 32 instruct the radio units 21, 31 to transmit the control signals including the time slot numbers assigned as the control signal time slots to the radio terminal 10. The radio units 21, 31 then transmit the control signals to the radio terminal 10.

(Transmission/Reception of Communication Signal)

The controller 41 of the control equipment 40 determines the communication signal time slots so that the uplink and downlink communication time slots can be different from each other. Further, the controller 41 determines the communication time slots from among the time slots other than the control signal time slots. In FIG. 4, the controller 41 determines a time slot No. 5 as the uplink communication signal time slot, and a time slot No. 7 as the downlink communication signal time slot in each frame.

The controller 41 instructs the transmission of the communication signal with the time slot No. 7, by transmitting control information instructing the use of the time slot No. 7 as the downlink communication signal time slot, through the interface 42 to the base station 20. The interface 23 of the base station 20 receives the control information and inputs the information to the controller 22. The controller 22 obtains information that the time slot No. 7 is assigned as the downlink communication signal time slot from the control information. The controller 22 instructs the radio unit 21 to transmit the communication signal to the radio terminal 10 in the time slot No. 7. Then, the radio unit 21 transmits the communication signal D130 to the radio terminal 10 in the time slot No. 7 of each frame with the frequency $f_1$.

Further, the controller 41 instructs the base station 20 to transmit the control information to the radio terminal 10, by transmitting control information for instructing the use of the time slot No. 5 as the uplink communication signal time slot, through the interface 42 to the base station 20. The base station 20 transmits a control signal including the control information for instructing the use of the time slot No. 5 as the uplink communication signal time slot, from the control equipment 40 to the radio terminal 10. The receiver 11 of the radio terminal 10 receives the control signal and inputs the signal to the controller 12. The controller 12 obtains information that the time slot No. 5 has been assigned as the uplink communication signal time slot from the control signal. The controller 12 instructs the radio unit 11 to transmit the communication signal in the time slot No. 5. Then, the radio unit 11 transmits the communication signal C120 to the base station 20 in the time slot No. 5 of each frame with the frequency $f_1$.

(Reception of Control Signal)

Next, a method for receiving the control signals is described. The controller 12 of the radio terminal 10 determines the reception time slot in which the radio terminal 10 receives the control signal, from among the plurality of control signal time slots in which the base stations 20, 30 transmit control signals. The controller 12 determines the reception time slots based on time differences between the uplink communication signal time slot and the plurality of control signal time slots. Specifically, the controller 12 determines the reception time slot so that the time difference can be smallest between the uplink communication signal time slot and the control signal time slot, which becomes a reference for controlling the transmission power when the radio unit 11 transmits the communication signal.

The controller 12 can determine the reception time slot by determining the time differences between the uplink communication signal time slot and the control signal time slots. The controller 12 first determines the reception time slot for receiving the control signal A110, from the time slots No. 1 and No. 9, which are the control signal time slots of the in-communication base station. In the time slots No. 1 and No. 9, the control signal A110, which is the control signal of the in-communication base station, is transmitted from the base station 20.

Figure 5:
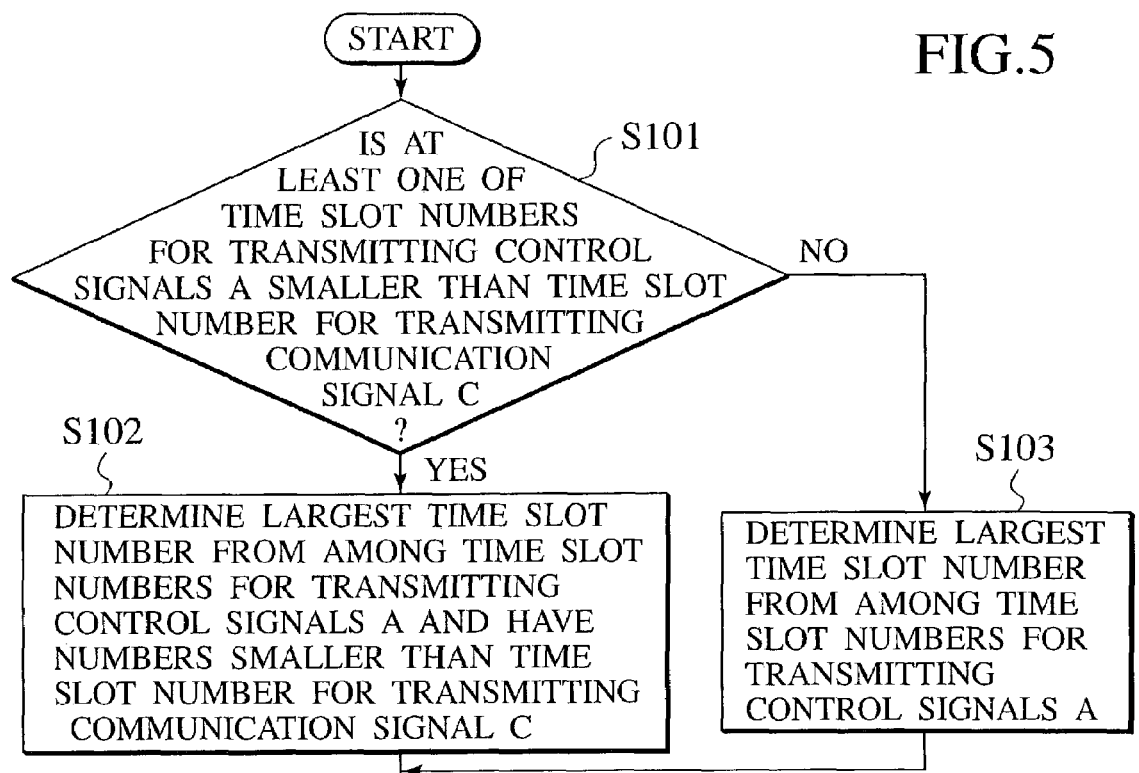
FIG. 5 is a flowchart showing a process of a reception time slot determining method according to the first embodiment of the present invention.

The controller 12 determines the reception time slot in accordance with a process shown in FIG. 5. First, the controller 12 determines whether at least one of the time slot numbers of the control signal time slots of the in-communication base station for transmitting the control signals A110 is smaller than the time slot number of the uplink communication signal time slot for transmitting the communication signal C120 by the radio terminal 10 (S101). Thus, the controller 12 can determine whether at least one of the control signal time slots of the in-communication base station is earlier than the uplink communication signal time slot.

If at least one of the time slot numbers of the control signal time slots of the in-communication base station for transmitting the control signal A110 is smaller than the time slot number of the uplink communication signal time slot for transmitting the communication signal C120 in step S101, as the reception time slot for receiving the control signal of the in-communication base station, the controller 12 determines to use the control signal time slot of the in-communication base station which has a largest time slot number, from among the control signal time slots of the in-communication base station for transmitting the control signals A110 which have the time slot numbers smaller than that of the uplink communication signal time slot for transmitting the communication signal C120 (S102).

Accordingly, as the reception time slot for receiving the control signal of the in-communication base station, the controller 12 can determine the control signal time slot of the in-communication base station which has a smallest time difference from the uplink communication signal time slot, from among the control signal time slots of the in-communication base station which are earlier than the uplink communication signal time slot.

On the other hand, if the time slot numbers of all the control signal time slots of the in-communication base station for transmitting the control signal A110 are larger than the time slot number of the uplink communication signal time slot for transmitting the communication signal C120 in step S101, as the reception time slot for receiving the control signal of the in-communication base station, the controller 12 determines the control signal time slot of the in-communication base station which has a largest time slot number, from among the control signal time slots of the in-communication base station for transmitting the control signals A110 (S103). Accordingly, as the reception time slot for receiving the control signal of the in-communication base station, the controller 12 can determine the control signal time slot of the in-communication base station, which has a largest time difference from the uplink communication signal time slot.

In the case of FIG. 4, the time slot No. 1, which is the control signal time slot of the in-communication base station for transmitting the control signal A10 is smaller than the time slot No. 5, which is the uplink communication signal time slot for transmitting the communication signal C120. Thus, the controller 12 proceeds to step S102 as a result of determination in step S101. Then, as the reception time slot for receiving the control signal A110, which is the control signal of the in-communication base station, the controller 12 determines the control signal time slot of the in-communication base station of the time slot No. 1, which has the largest time slot number from among the control signal time slots of the in-communication base station for transmitting the control signal A110, which have time slot numbers smaller than the time slot No. 5 of the uplink communication signal time slot for transmitting the communication signal C120. In this way, the controller 12 first determines the time slot No. 1 as the reception time slot for receiving the control signal A110, from among the control signal time slots for transmitting the control signal A110, which is the control signal of the in-communication base station.

Lastly, the controller 12 determines the reception time slot for receiving the control signal B111, which is the control signal of not-in-communication base station, from among the control signal time slots other than the determined reception time slot for receiving the control signal A110, which is the control signal of the in-communication base station. In the case of FIG. 4, the controller determines the control signal time slot of the time slot No. 9, which is the time slot other than the time slot No. 1, as the reception time slot for receiving the control signal B111, the time slot No. 1 is the reception time slot for receiving the control signal A110 as the control signal of the in-communication base station.

Then, the controller 12 instructs the radio unit 11 to receive the control signals in the determined reception time slots. The radio unit 11 receives the control signal A110 in the time slot No. 1 with the frequency $f_1$. The radio unit 11 receives the control signal B111 in the time slot No. 9 with the frequency $f_2$.

According to the radio communication system 1, the radio terminal 10, the base stations 20, 30, the control equipment 40 and the communication method, the radio units 21, 31 of the base stations 20, 30 transmit the control signals A110 and B111 with the plurality of control signal time slots included in one frame. Then, the controller 12 of the radio terminal 10 determines the reception time slot for receiving the control signals A110 and B111, from among the plurality control signal time slots. The radio unit 11 receives the control signals A110 and B111 in the determined reception time slots. Further, the radio unit 11 transmits the communication signal C120 to the base station 20 with the uplink communication signal time slot other than the control signal time slots.

Accordingly, from the plurality of base stations 20, 30, the control signals A110 and B111 are transmitted in one frame a plurality of times. The radio terminal 10 selects the reception time slots for receiving the control signals A110 and B111 from the base stations 20, 30. Thus, the radio terminal 10 can receive the control signals A110 and B111 from the base stations 20, 30. Further, the radio terminal 10 can transmit the communication signal C120 with the uplink communication signal time slot other than the control signal time slots.

Thus, the radio terminal 10 can always receive the control signal B111, which is necessary for the handover, from the base station 30 other than the base station 20, which is in communication with the radio terminal 10, at least once in one frame. Further, the radio terminal 10 can control the transmission power by receiving the control signal A110, which is necessary for transmission power control, from the base station 20 in communication with the radio terminal 10. Then the radio terminal 10 can transmit the communication signal to the base station 20. Thus, the radio terminal 10 and the base station 20 in communication with each other can satisfactorily communicate without reducing the communication capacity.

The controller 12 of the radio terminal 10 determines the reception time slot based on the time difference between the uplink communication signal time slot and the plurality of control signal time slots. Specifically, the controller 12 determines the reception time slot so that a time difference can be minimized between the uplink communication signal time slot and the control signal time slot, which becomes the reference for transmission power control when the radio unit 11 transmits communication signal C120. Accordingly, the controller 12 can determine the reception time slot so that an effect of the transmission power control can be increased when the radio unit 11 transmits the communication signal C120. Moreover, the controller 12 uses the time slot numbers to determine the time differences between the uplink communication signal time slot and the control signal time slots, and determines the reception time slot. Accordingly, the reception time slot can be easily determined.

Further, when the controller 12 determines the reception time slot from among the control signal time slots of the in-communication base station, as the reception time slot for receiving the control signal of the in-communication base station, the controller 12 determines the time slot No. 1, which is the control signal time slot of the in-communication base station having a smallest time difference from the uplink communication signal time slot, from among the control signal time slots of the in-communication radio station earlier than the uplink communication signal time slot, if at least one of the time slot numbers of the control signal time slots of the in-communication base station is smaller than that of the uplink communication signal time slot, in other words, if at least one of the control signal time slot of the in-communication base station is earlier than the uplink communication signal time slot.

Thus, the controller 12 can minimize the time difference between the control signal time slot of the time slot No. 1 which becomes the reference for transmission power control when the radio unit 11 transmits the communication signal C120 and the uplink communication signal time slot of the time slot No. 5. As a result, it is possible to increase the effect of transmission power control when the radio terminal 10 transmits the communication signal C120.

On the other hand, if the time slot numbers of all the control signal time slots of the in-communication base station are larger than the time slot number of the uplink communication signal time slot, in other words, if all the control signal time slots of the in-communication base station are later than the uplink communication signal time slot, as the reception time slot for receiving the control signal of the base station, which is in communication, the controller 12 determines the control signal time slot of the in-communication base station having a largest time difference from the uplink communication signal time slot.

Accordingly, after the radio unit 11 transmits the communication signal C120, the controller 12 can set the control signal time slot, which becomes the reference for transmission power control the radio unit 11 transmits the communication signal C120 next time, close to the uplink communication signal time slot for transmitting the communication signal C120 next time. Thus, the controller 12 can minimize the time difference between the uplink communication signal time slot and the control signal time slot, which becomes the reference for transmission power control when the radio unit 11 transmits the communication signal C120. As a result, it is possible to increase the effect of the transmission power control when the radio terminal 10 transmits the communication signal C120.

The controller 41 of the control equipment 40 determines the control signal time slots, and the radio units 21, 31 of the base stations 20, 30 transmit the control signals A110, B111 in the control signal time slots determined by the controller 41, respectively. Thus, the base stations 20, 30 can transmit the control signals A110, B111 by changing the transmission timing in accordance with a communication situation at the time.

Furthermore, the controller 41 determines two time slots included in one frame as the control signal time slots so that the base stations 20, 30 can transmit the control signal twice in one frame, and determines the control signal time slots so that the base station 20 and the base station 30 both can transmit the control signals in the same time slot. Thus, the radio communication system 1 can limit the number of time slots occupied for transmitting the control signals A110, B111 to two. Therefore, many time slots can be used for transmission/reception of the communication signals. Accordingly, the radio communication system 1 is advantageous particularly, when there are many base stations 20, 30 and many frequencies are necessary for connecting the radio links.

Second Embodiment

The radio terminal 10 may determine the reception time slot in the following manner, and receives the control signals.

The controller 12 of the radio terminal 10 determines the reception time slot so that a time difference can be smallest between the uplink communication signal time slot and the control signal time slot, which becomes the reference for transmission power control when the radio unit 11 transmits the communication signal. The controller 12 first determines the reception time slot for receiving the control signal B111, which is the control signal of the not-in-communication base station, from the time slots No. 1 and No. 9, which are the control signal time slots of the not-in-communication base station. In the time slots No. 1 and No. 9, the base station 30 transmits the control signal B111, which is the control signal of the not-in-communication base station. Here, the base station 30 is not in communication with the radio terminal 10.

Figure 6:
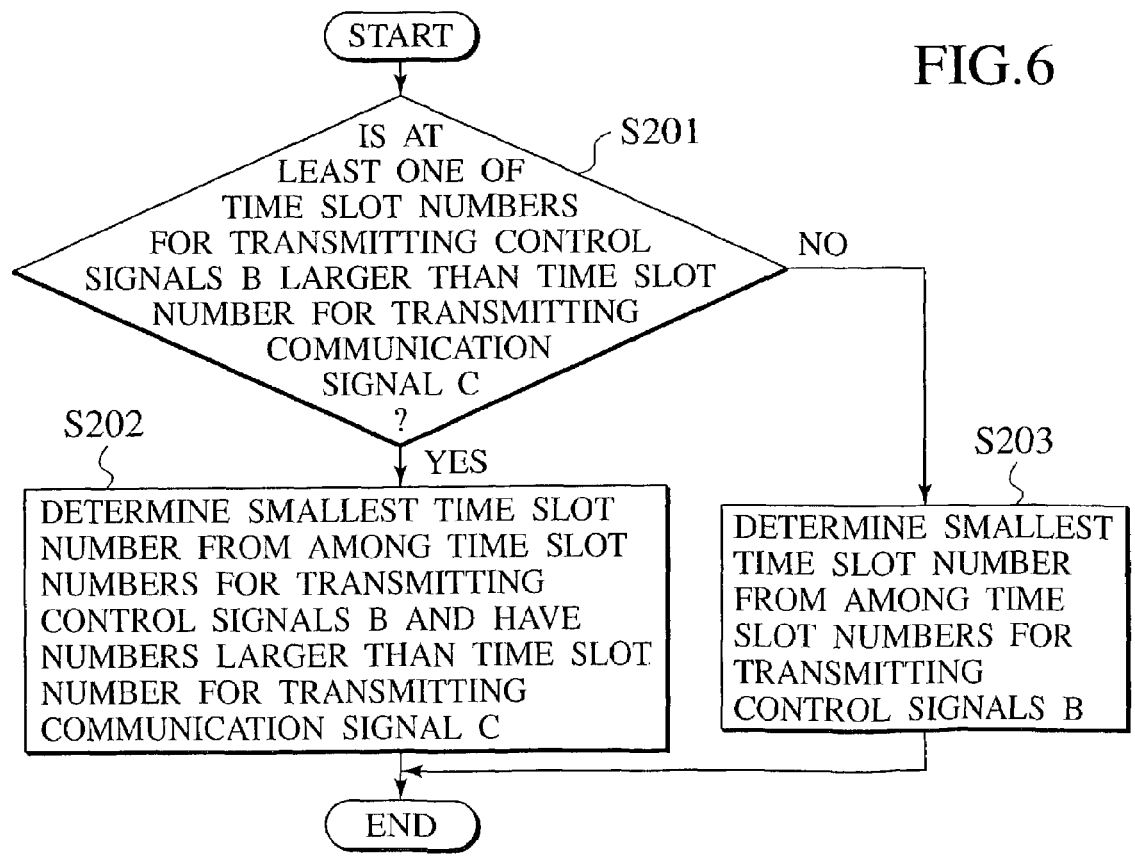
FIG. 6 is a flowchart showing a process of a reception time slot determining method according to a second embodiment of the present invention.

Specifically, the controller 12 determines the reception time slot in accordance with a process shown in FIG. 6. First, the controller 12 determines whether at least one of time slot numbers of the control signal time slots of the not-in-communication base station for transmitting the control signals B111 is larger than the time slot number of the uplink communication signal time slot, in which the radio unit 11 transmits a communication signal C120 (S201). Thus, the controller 12 can determine whether at least one of the control signal time slots of the not-in-communication base station is later than the uplink communication signal time slot.

If at least one of the time slot numbers of the control signal time slots of the not-in-communication base station for transmitting the control signal B111 is smaller than the time slot number of the uplink communication signal time slot for transmitting the communication signal C120 in step S201, as the reception time slot for receiving the control signal of the not-in-communication base station, the controller 12 determines the control signal time slot of the not-in-communication base station which has a smallest time slot number from among the control signal time slots of the not-in-communication base station for transmitting the control signals B111 which have the time slot numbers larger than the time slot number of the uplink communication signal time slot for transmitting the communication signal C120 (S202). Accordingly, as the reception time slot for receiving the control signal of not-in communication base station, the controller 12 can determine the control signal time slot of the not-in-communication base station which has a smallest time difference from the uplink communication signal time slot, from among the control signal time slots of the not-in-communication base station later than the uplink communication signal time slot.

On the other hand, if the time slot numbers of all the control signal time slots of the not-in-communication base station for transmitting the control signal B111 are smaller than the time slot number of the uplink communication signal time slot for transmitting the communication signal C120 in step S201, as the reception time slot for receiving the control signal of the base station, which is not in communication, the controller 12 determines the control signal time slot of the not-in-communication base station, which has the smallest time slot number, from among the control signal time slots of the not-in-communication base station for transmitting the control signals B111 (S203). Accordingly, as the reception time slot for receiving the control signal of the not-in-communication base station, the controller 12 can determine the control signal time slot of the not-in-communication base station, which has a largest time difference from the uplink communication signal time slot.

In the case of FIG. 4, the time slot No. 9 of the control signal time slot of the not-in-communication base station for transmitting the control signal B111 is larger than the time slot No. 5 of the uplink communication signal time slot for transmitting the communication signal C120. Thus, the controller 12 proceeds to step S202 as a determined result in step S201. Then, as the reception time slot for receiving the control signal B111, which is the control signal of the not-in-communication base station, the controller 12 determines the control signal time slot of the not-in-communication base station of the time slot No. 9 having the smallest time slot number, from among the control signal time slots of the not-in-communication base station for transmitting the control signal B111 which have the time slot numbers larger than that of the uplink communication signal time slot for transmitting the communication signal C120. In this way, the controller 12 first determines the time slot No. 9 as the reception time slot for receiving the control signal B111, from among the control signal time slots for transmitting the control signal B111, which is the control signal of the not-in-communication base station.

Lastly, the controller 12 determines the reception time slot for receiving the control signal A110, which is the control signal of the in-communication base station, from among the control signal time slots other than the determined reception time slot for receiving the control signal B111, which is the control signal of the not-in-communication base station. In the case of FIG. 4, the controller determines the control signal time slot of the time slot No. 1 as the reception time slot for receiving the control signal A110. The control signal time slot of the time slot No. 1 is the time slot other than the time slot No. 9, as the reception time slot for receiving the control signal B111.

Then, the controller 12 instructs the radio unit 11 to receive the control signals in the determined reception time slots. The radio unit 11 receives the control signal A110 in the time slot No. 1 with the frequency $f_1$. The radio unit 11 receives the control signal B111 in the time slot No. 9 with the frequency $f_2$.

Thus, when the controller 12 determines the reception time slot from among the control signal time slots of the not-in-communication base station, as the reception time slot for receiving the control signal B111, which is the control signal of the base station, which is not in communication, the controller 12 determines the time slot No. 9, which is the control signal time slot of the not-in-communication base station having a smallest time difference from the uplink communication signal time slot, from among the control signal time slots of the not-in-communication base station later than the uplink communication signal time slots, if at least one of the time slot numbers of the control signal time slots of the not-in-communication base station is larger than that of the uplink communication signal time slot, in other words, if at least one of the control signal time slots of the not-in-communication base station is later than the uplink communication signal time slot.

Thus, after the radio unit 11 transmits the communication signal C120 in the frame No. 1, the controller 12 can set the control signal time slot of the not-in-communication base station for receiving the control signal B111, which is the control signal of the not-in-communication base station having no relation to transmission power control, apart from the uplink communication signal time slot, in which the radio unit 11 transmits the communication signal C120 in a frame No. 2. Accordingly, the controller 12 can assign the time slot which is earlier than the uplink communication signal time slot for transmitting the communication signal C120 in the frame No. 2 and has a small time difference from the uplink communication signal time slot, to the control signal time slot for transmitting the control signal A110 which becomes the reference for transmission power control. As a result, it is possible to increase the effect of transmission power control when the radio terminal 10 transmits the communication signal C120 in the frame No. 2.

On the other hand, if the time slot numbers of all the control signal time slots of the not-in-communication base station are smaller than the time slot number of the uplink communication signal time slot, in other words, all the control signal time slots of the not-in-communication base station are earlier than the uplink communication signal time slots, the controller 12 determines the control signal time slot of the not-in-communication base station which has a largest time difference from the uplink communication signal time slots, as the reception time slot for receiving the control signal B111, which is the control signal of the not-in-communication base station.

Thus, the controller 12 can set the control signal time slot of the not-in-communication base station for receiving the control signal B111, which is the control signal of the not-in-communication base station having no relation to transmission power control, apart from the uplink communication signal time slot in which the radio unit 11 transmits the communication signal C120. Accordingly, the controller 12 can assign the time slot, which is located before the uplink communication signal time slot and has a small time difference from the uplink communication signal time slot to the control signal time slot for transmitting the control signal, which becomes the reference for transmission power control. In the uplink communication signal time slot, the radio unit 11 transmits the communication signal C120. As a result, it is possible to increase the effect of transmission power control when the radio terminal 10 transmits the communication signal C120.

Third Embodiment

The control equipment 40 may control transmission of the control signals in the following manner, and the base stations 20, 30 may transmit the control signals. In such a case, the radio terminal 10 may determine the reception time slot for receiving the control signals.

(Transmission of Control Signal)

The controller 41 of the control equipment 40 functions as a determining unit configured to determine whether the radio terminal 10 needs to receive the control signals from a plurality of base stations 20, 30. Specifically, the controller 41 obtains the control information regarding the qualities of the control signals received from the radio terminal 10, from the base stations 20, 30 through the interface 42. A description will be given by taking an example where the radio terminal 10 is in communication with the base station 20.

If the quality of the control signal A from the base station 20, which is in communication with the radio terminal 10 has deteriorated, a handover must be carried out. Accordingly, the controller 41 determines that the radio terminal 10 must receive not only the control signal A from the base station 20 but also the control signal B from the base station 30, in other words, the radio terminal 10 must receive the control signals from a plurality of base stations 20, 30. On the other hand, if the quality of the control signal A from the base station 20 is good, it is not necessary to carry out the handover. Accordingly, the controller 41 determines that the radio terminal 10 does not need to receive the control signals from the plurality of base stations 20, 30, but needs to receive only the control signal A from the base station 20 which is in communication with the radio terminal 10.

Then, when the controller 41 determines that the radio terminal needs to receive the control signals from the plurality of base stations 20, 30, the controller 41 determines to use a plurality of time slots included in one frame as control signal time slots. On the other hand, when the controller 41 determines that the radio terminal 10 does not need to receive the control signals from the plurality of base stations 20, 30, the controller 41 determines to use one time slot in one frame as the control signal time slot. Thus, the controller 41 can control switching between transmission of the control signals with a plurality of control signal time slots included in one frame and transmission of the control signal with one control signal time slot included in one frame.

Thus, in some cases, the base stations 20, 30 are assigned a plurality of time slots included in one frame as the control signal time slots by the control equipment 40. In other cases, the base stations 20, 30 are assigned one time slot in one frame by the control equipment 40. The controllers 22, 32 of the base stations 20, 30 instruct the radio units 21, 31 to transmit the control signals in accordance with the assignment from the control equipment 40, respectively. Accordingly, the radio units 21, 31 can switch between transmission of the control signals with a plurality of control signal time slots included in one frame and transmission of the control signals with one control signal time slot included in one frame.

Next, detailed description will be given of transmission of the control signals by referring to FIG. 4. The controller 41 of the control equipment 40 determines to use one time slot in one frame as the control signal time slot when the controller 41 determines that the radio terminal 10 does not need to receive the control signal B from the base station 30 with which the radio terminal 10 is not in communication. For example, the controller 41 determines to use the time slot No. 1 as the control signal time slot. Then, the radio units 22, 32 of the base stations 20, 30 respectively transmit the control signals A and B in the time slot No. 1.

On the other hand, the controller 41 of the control equipment 40 determines to use a plurality of time slots in one frame as control signal time slots when the controller 41 determines that the radio terminal 10 does not need to receive the control signal B from the base station 30, with which the radio terminal 10 is not in communication. The controller 41 determines to use another time slot as the control signal time slot in addition to the time slot No. 1 which has been determined to use as the control signal time slot. However, the controller 41 determines only the control signal time slots for transmitting the control signal A from the base station 20, and makes the base station 20 transmit the control signal A twice.

For example, the controller 41 determines to use the time slot No. 9 as the control signal time slot for transmitting the control signal A in addition to the time slot No. 1. Then, the radio unit 22 of the base station 20 transmits the control signal A twice in the time slots No. 1 and No. 9. On the other hand, the radio unit 32 of the base station 30 transmits the control signal B only once in the time slot No. 1.

The controller 41 may determine to use only the control signal time slot in which the base station 30 transmits the control signal B, and the base station 30 may transmit the control signal B twice. The controller 41 may determine both the control signal time slot in which the base station 20 transmits the control signal A and the control signal time slot in which the base station 30 transmits the control signal B, and the base stations 20, 30 may transmit the control signal A and the control signal B twice.

Further, the controller 41 may determine a control signal time slots based on a time difference between the uplink communication signal time slot and each time slot. In this case, the controller 41 determines the control signal time slot so that the time difference from the control signal time slot can be reduced.

Specifically, the controller 41 uses the time slot numbers to determine the time difference between the uplink communication signal time slot and each time slot, and determines the control signal time slot. For example, when the controller 41 determines to use another control signal time slot in which the base station 20 transmits the control signal A in addition to the time slot No. 1 which has been determined for use as the control signal time slot, the controller 41 first selects a time slot earlier than the time slot for transmitting a certain communication signal C. For example, if the time slot for transmitting the communication signal C is the time slot No. 5, the controller 41 selects time slots having time slot numbers smaller than that of the time slot No. 5, i.e., the time slots No. 1 to No. 4.

Then, the controller 41 selects, from among the selected time slot numbers having time slot numbers smaller than that of the time slot No. 5, the time slot in which the base station 20 can transmit the control signal A and in which the radio terminal 10 does not receive the communication signal D, the control signal A or the control signal B from the base stations 20, 30. The time slot in which the base station 20 can transmit the control signal A means time slots other than the uplink communication signal time slot, which the radio terminal 10 uses to transmit the communication signal C to the base station 20. If the communication signal C is not transmitted, the time slots No. 1 to No. 4 are selected.

Lastly, as the control signal time slot, the controller 41 determines to use the time slot of the largest time slot number, from among the selected time slots in which the base station 20 can transmit the control signal A and in which the radio terminal 10 does not receive the communication signal D, the control signal A or the control signal B from the base stations 20, 30. Accordingly, the time slot No. 4 is selected.

Thus, as the control signal time slot of the control signal A which becomes the reference for transmission power control when the radio terminal 10 transmits communication signal C, the controller 41 can determine to use the time slot having a smallest time difference from the uplink communication signal time slot for transmitting the communication signal C, from among the time slots which are earlier than the communication signal time slot of the communication signal C and not used for transmission/reception of the communication signal C, the control signal A or the control signal B (Reception of Control Signal)

When the control equipment 40 determines that the radio terminal 10 does not need to receive the control signal B from the base station 30 with which the radio terminal 10 is not in communication, the base stations 20, 30 transmit the control signals A, B only in the time slot No. 1, in other words, one control signal time slot in one frame. In this case, the controller 12 of the radio terminal 10 determines to use the control signal time slot of the time slot No. 1 as the reception time slot for receiving the control signal A from the base station 20, which is in communication with the radio terminal 10. Then, the radio unit 11 receives the control signal A in the control signal time slot of the time slot No. 1.

On the other hand, when the control equipment 40 determines that the radio terminal 10 needs to receive the control signal B from the base station 30 with which the radio terminal 10 is not in communication, the base station 20 transmits the control signal A in the two time slots No. 1 and No. 9, i.e., the plurality of control signal time slots in one frame. The base station 30 transmits the control signal B only in the time slot No. 1, in other words, one control signal time slot in one frame.

In this case, since there is only one control signal time slot for transmitting the control signal B, the controller 12 of the radio terminal 10 determines to use the control signal time slot of the time slot No. 1, as the reception time slot for receiving the control signal B from the base station 30, which is not in communication with the radio terminal 10. Then, the controller 12 determines to use the control signal time slot of the time slot No. 9, which is the time slot other than the time slot No. 1 for receiving the control signal B from the base station 30, as the reception time slot for receiving the control signal A from the base station 20, which is in communication with the radio terminal 10. Here, the base station 20 is not in communication with the radio terminal 10. Then, the radio unit 11 receives the control signal B in the control signal time slot of the time slot No. 1 and the control signal A in the control signal time slot of the time slot No. 9.

In this way, the controller 41 of the control equipment 40 determines the control signal time slots based on the time difference between the uplink communication signal time slot and each time slot. Thus, the control signal time slot can be determined so that the time difference can be smallest between the uplink communication signal time slot and the control signal time slot, which becomes the reference for transmission power control when the radio unit 11 of the radio terminal 10 transmits the communication signal C. As a result, it is possible to increase the effect of transmission power control when the radio unit 11 transmits the communication signal C.

Further, the controller 41 determines whether the radio terminal 10 needs to receive the control signals from a plurality of base stations 20, 30. Then, based on a result of the determination, the radio units 21, 31 of the base stations 20, 30 switch between transmission of the control signals with a plurality of control signal time slots included in one frame and transmission of the control signals with one control signal time slot included in one frame.

Thus, the radio units 21, 31 can transmit the control signals with a plurality of control signal time slots included in one frame only when the radio terminal 10 needs to receive the control signals from a plurality of base stations 20, 30, in the case where the radio terminal 10 carries out the handover. In other cases, the radio units 21, 31 can transmit the control signals with one control signal time slot included in one frame. Accordingly, the base stations 20, 30 can prevent useless transmission of the control signals and effectively use the time slots.

Fourth Embodiment

The control equipment 40, the base stations 20, 30 and the radio terminal 10 may communicate in the following manner. A description will be given by taking an example where the radio terminal 10 communicates with the base station 20.

The controller 41 of the control equipment 40 functions as an assignment unit configured to preferentially assign a time slot other than a control signal time slot of a not-in-communication base station, which is used for transmitting a control signal B, which is the control signal of the not-in-communication base station from the base station 30, to a communication signal time slot. The radio terminal 10 is not in communication with the base station 30.

When the controller 41 cannot assign the time slot other than the control signal time slot of the not-in-communication base station to the communication signal time slot, the controller 41 assigns the control signal time slot of the not-in-communication base station to the communication signal time slot. Then, when the radio terminal 10 needs to receive the control signal B, which is the control signal of the not-in-communication base station, the controller 41 switches the communication signal time slot to the time slot other than the control signal time slot of the not-in-communication base station.

For example, the controller 41 changes a channel of the radio terminal 10, where the control signal time slot of the not-in-communication base station is assigned to the communication signal time slot, by assigning the time slot other than the control signal time slot of the not-in-communication base station to the communication signal time slot. Alternatively, the controller 41 replaces the channel of the radio terminal 10, where the control signal time slot of the not-in-communication base station is assigned to the communication signal time slot, by a channel of the other radio terminal where the time slot other than the control signal time slot of the not-in-communication base station is assigned as the communication signal time slot. Thus, the controller 41 can switch the communication signal time slot to the time slot other than the control signal time slot of the not-in-communication base station.

The control signal time slots of the base stations 20, 30 are preset to the time slots different between the base stations 20, 30 in each frame. Accordingly, the control equipment 40 controls the base stations 20, 30 so as to transmit the control signals in the preset control signal time slots. Thus, also the controller 12 of the radio terminal 10 controls the radio unit 11 so as to receive the control signals A, B from the base stations 20, 30 in the preset control signal time slots different between the base stations 20, 30.

Figure 7:
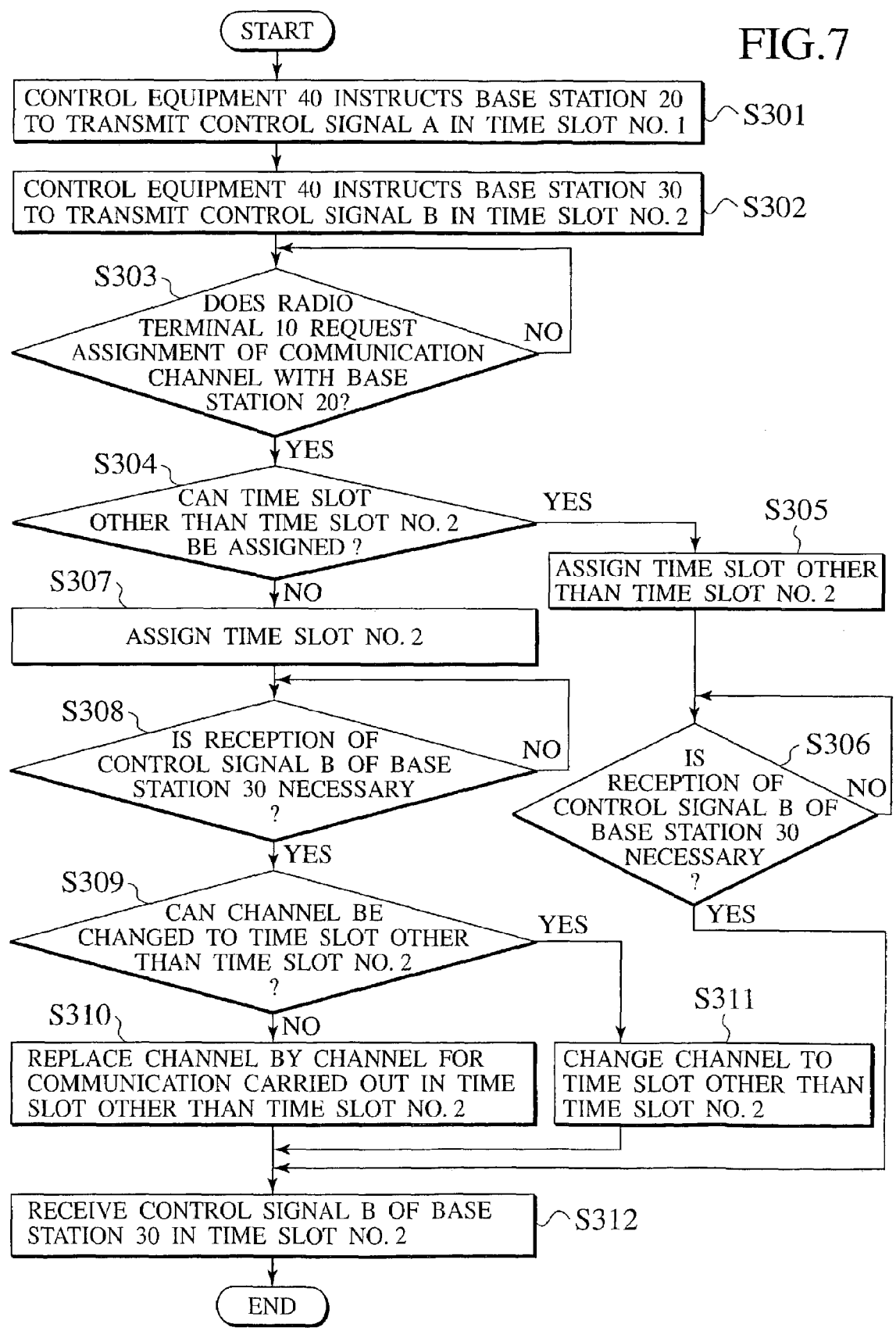
FIG. 7 is a flowchart showing a process of a communication method according to a fourth embodiment of the present invention.

Next, a communication method will be described more in detail by referring to FIG. 7. First, the controller 41 of the control equipment 40 instructs the base station 20 to transmit the control signal A in the time slot No. 1. The base station 20 transmits the control signal A in the time slot No. 1 (S301). Then, the controller 41 instructs the base station 30 to transmit the control signal B in the time slot No. 2. The base station 30 transmits the control signal B in the time slot No. 2 (S302).

Then, the radio terminal 10 requests assignment of the communication signal time slot, in order to communicate with the base station 20. Specifically, the radio terminal 10 transmits a communication channel assignment request for assignment of a channel between the radio terminal 10 and the base station 20, through the base station 20 to the control equipment 40 (S303). In this case, the controller 41 determines whether the time slot other than the control signal time slots of the not-in-communication base station, in other words, the time slot other than the time slot No. 2, in which the base station 30 transmits the control signal B, can be assigned to the communication signal time slot of the radio terminal 10. In other words, the controller 41 determines whether the time slot other than the time slot No. 2 can be assigned to the channel between the radio terminal 10 and the base station 20 (S304). While there is no communication channel request from the radio terminal 10 in step S303, the control equipment 40 assigns no communication signal time slots.

If the time slot other than the time slot No. 2, in other words, the time slot other than the control signal time slot of the not-in-communication base station, can be assigned to the communication signal time slot of the radio terminal 10 in step S304, the controller 41 assigns the time slot other than the time slot No. 2 to the communication signal time slot of the radio terminal 10 (S305). Thus, the radio terminal 10 and the base station 20 start to communicate with each other. Then, when the radio terminal 10 needs to receive the control signal B from the base station 30 (S306), the radio terminal 10 receives the control signal B transmitted from the base station 30 in the time slot No. 2, which is the control signal time slot of the not-in-communication base station with the frequency $f_2$ (S312). If there is no need to receive the control signal B from the base station 30 in step (S306), the radio terminal 10 does not receive the control signal B.

On the other hand, if the time slot other than the time slot No. 2, in other words, the time slot other than the control signal time slot of the not-in-communication base station, cannot be assigned to the communication signal time slot of the radio terminal 10 in step S304, the controller 41 of the control equipment 40 assigns the time slot No. 2 to the communication signal time slot of the radio terminal 10 (S307). Thus, the radio terminal 10 and the base station 20 start to communicate with each other.

Then, when the radio terminal 10 needs to receive the control signal B from the base station 30 (S308), the controller 41 determines whether the channel of the radio terminal 10, where the time slot No. 2 as the control signal time slot of the not-in-communication base station is assigned to the communication signal time slot, can be changed by assigning a time slot other than the time slot No. 2 to the communication signal time slot (S309).

If the channel of the radio terminal 10 where the time slot No. 2 is assigned to the communication signal time slot can be changed by assigning a time slot other than the time slot No. 2 to the communication signal time slot in step S309, the controller 41 changes the channel of the radio terminal 10 to a channel where a time slot other than the time slot No. 2 is assigned to the communication signal time slot (S311). Then, the radio terminal 10 receives the control signal B transmitted from the base station 30 in the time slot No. 2 with the frequency $f_2$ (S312).

On the other hand, if the channel of the radio terminal 10 where the time slot No. 2 is assigned to the communication signal time slot cannot be changed to a time slot other than the time slot No. 2 in step 309, the controller 41 replaces the channel used for communications between the radio terminal 10 and the base station 20 where the time slot No. 2 as the control signal time slot of the not-in-communication base station is assigned to the communication signal time slot, by a channel of the other radio terminal where the time slot other than the time slot No. 2 is assigned to the communication signal time slot, and communications are carried out (S310). Then, the radio terminal 10 receives the control signal transmitted from the base station 30 in the time slot No. 2 with the frequency $f_2$ (S312). While it is not necessary for the radio terminal 10 to receive the control signal B from the base station 30 in step S308, no process is carried out to receive the control signal B.

Thus, when the base stations 20, 30 respectively transmit the control signals A, B in different time slots, the controller 41 of the control equipment 40 can assign the time slot other than the control signal time slot of the not-in-communication base station which is used for transmitting the control signal B, which is the control signal of the not-in-communication base station from the base station 30 with which the radio terminal 10 is not in communication, in priority to the other time slots, to the communication signal time slot.

Therefore, it is possible to prevent the assignment of the control signal time slot of the not-in-communication base station to the communication signal time slot as much as possible. As the result, the control equipment 40 can save the control signal time slot of the not-in-communication base station for transmitting the control signal B, which is the control signal of the not-in-communication base station. Thus, the radio terminal 10 can receive the control signal B, which is necessary for the handover, from the base station 30, which is not in communication with the radio terminal 10. Moreover, the radio terminal 10 and the base station 20, which are in communication with each other can transmit/receive the communication signal C in the communication signal time slot other than the control signal time slot of the not-in-communication base station. Thus, the radio terminal 10 and the base station 20 can satisfactorily communicate.

Even if the time slot other than the control signal time slot of the not-in-communication base station cannot be assigned to the communication signal time slot, the controller 41 assigns the control signal time slot of the not-in-communication base station to the communication signal time slot. Thus, the radio terminal 10 and the base station 20 can start communications with the communication signal time slot thus assigned. Then, when the radio terminal 10 needs to receive the control signal B, which is the control signal of the not-in-communication base station, the controller 41 switches the communication signal time slot to the time slot other than the control signal time slot of the not-in-communication base station. As a result, the control signal time slot of the not-in-communication base station can be temporarily saved to transmit the control signal B, which is the control signal of the not-in-communication base station. Thus, the radio terminal 10 can receive the control signal B, which is necessary for the handover, from the base station 30, which is not in communication.

The present invention is not limited to the foregoing first to fourth embodiments, and various changes can be made. For example, in the first to fourth embodiments, the two base stations 20, 30, which use mutually different frequencies are used. However, the invention allows the use of one base station, which carries out simultaneous communications with a plurality of frequencies.

What is claimed is:

1. A radio communication system, comprising:
   a radio terminal;
   a first base station configured to communicate with the radio terminal;
   a second base station which is a handover destination of the radio terminal; and
   a control equipment connected to the first base station and the second base station, wherein
   the control equipment includes a transmission time slot determining unit configured to determine a plurality of control signal time slots and an uplink communication signal time slot, from among a plurality of time slots included in a frame,
   the first base station includes a first control signal transmitter configured to transmit control signals by using the control signal time slots determined by the transmission time slot determining unit,
   the second base station includes a second control signal transmitter configured to transmit control signals by using the same control signal time slots used by the first base station, and
   the radio terminal includes:
      a reception time slot determining unit configured to determine a reception time slot for receiving one of the control signals transmitted from the first base station, and determine a reception time slot for receiving one of the control signals transmitted from the second base station respectively, from among the control signal time slots determined by the transmission time slot determining unit,
      a control signal receiver configured to receive the control signals transmitted from the first base station and the second base station respectively, based on a result of a determination by the reception time slot determining unit, and
      a communication signal transmitter configured to transmit a communication signal including data to the first base station in the uplink communication signal time slot determined by the transmission time slot determining unit, wherein
   the reception time slot determining unit determines a time slot which has a smallest time difference from the uplink communication signal time slot as the reception time slot for receiving one of the control signals transmitted from the first base station from among the control signal time slots which are earlier than the uplink communication signal time slot, if at least one of the control signal time slots are earlier than the uplink communication signal time slot, and determines a time slot which has a largest time difference from the uplink communication signal time slot as the reception time slot for receiving one of the control signals transmitted from the first base station from among the control signal time slots, if all the control signal time slots are later than the uplink communication signal time slot, when reception time slot determining unit determines the reception time slot for receiving one of the control signals transmitted from the first base station.

2. A radio terminal comprising:
   a reception time slot determining unit configured to determine a first reception time slot for receiving a control signal transmitted from a first base station using a plurality of control signal time slots included in a frame, and determine a second reception time slot for receiving a control signal transmitted from a second base station using the control signal time slots, from among the plurality of control signal time slots;
   a control signal receiver configured to receive the control signals transmitted from the first base station using the first reception time slot determined by the reception time slot determining unit, and receive the control signal transmitted from the second base station using the second reception time slot determined by the reception time slot determining unit; and
   a communication signal transmitter configured to transmit a communication signal including data to the base station in an uplink communication signal time slot other than the control signal time slots, wherein
   the first base station is communicating with the radio terminal,
   the second base station is a handover destination of the radio terminal, and
   the reception time slot determining unit determines a time slot which has a smallest time difference from the uplink communication signal time slot as the reception time slot for receiving one of the control signals transmitted from the first base station from among the control signal time slots which are earlier than the uplink communication signal time slot, if at least one of the control signal time slots are earlier than the uplink communication signal time slot, and determines a time slot which has a largest time difference from the uplink communication signal time slot as the reception time slot for receiving one of the control signals transmitted from the first base station from among the control signal time slots, if all the control signal time slots are later than the uplink communication signal time slot, when reception time slot determining unit determines the reception time slot for receiving one of the control signals transmitted from the first base station.

3. A control equipment comprising:
a transmission time slot determining unit configured to determine a plurality of control signal time slots, from among a plurality of time slots included in one frame; and
a base station controller configured to instruct a first base station to transmit control signals by using the control signal time slots determined by the transmission time slot determining unit, and instruct a second base station to transmit control signals by using the same control signal time slots used by the first base station, wherein
the first base station is a base station communicating with the radio terminal, and
the second base station is a handover destination of the radio terminal, and wherein
the transmission time slot determining unit determines the control signal time slots based on a time difference between an uplink communication signal time slot in which a radio terminal transmits a communication signal including data to the base station, and each time slot, and selects time slots as control signal time slots that are earlier than a time slot that includes the communication signal with the data.

4. The control equipment according to claim 3, further comprising:
a determining unit configured to determine whether the radio terminal needs to receive the control signals from the first base station and the second base station,
wherein the base station controller switches between transmission of the control signals with the plurality of control signal time slots included in one frame and transmission of the control signals with one control signal time slot included in one frame based on a determination result by the determining unit.

5. The control equipment according to claim 3, further comprising:
an assignment unit configured to preferentially assign a time slot other than a control signal time slot of a not-in-communication base station, which is used for transmitting a control signal of the second base station, to a communication signal time slot in which a radio terminal transmits/receives a communication signal including data to/from the first base station.

6. The control equipment according to claim 5, wherein the assignment unit assigns the control signal time slot of the second base station to the communication signal time slot, when the assignment unit cannot assign the time slot other than the control signal time slot of the second base station, to the communication signal time slot, and
the assignment unit switches the communication signal time slot to the time slot other than the control signal time slot of the second base station, when the radio terminal receives the control signal of the second base station.

7. A communication method comprising: determining, by a control equipment, a plurality of control signal time slots and an uplink communication signal time slot, from among a plurality of time slots included in one frame;
transmitting, by a first base station, control signals to a radio terminal by using the control signal time slots determined by the control equipment;
transmitting, by a second base station, control signals to the radio terminal by using the same control signal time slots used by the first base station;
determining, by a radio terminal, a reception time slot for receiving one of the control signals transmitted from the first base station, and determine a reception time slot for receiving one of the control signals transmitted from the second base station respectively, from among the plurality of control signal time slots determined by the control equipment;
receiving the control signals transmitted from the first base station and the second base station respectively, based on the determined reception time slots; and
transmitting a communication signal including data to the first base station in the uplink communication signal time slot determined by the control equipment, wherein
determining a control signal time slot which has a smallest time difference from the uplink communication signal time slot as the reception time slot for receiving one of the control signals transmitted from the first base station from among the control signal time slots which are earlier than the uplink communication signal time slot, if at least one of the control signal time slots are earlier than the uplink communication signal time slot, and determines a time slot which has a largest time difference from the uplink communication signal time slot as the reception time slot for receiving one of the control signals transmitted from the first base station from among the control signal time slots, if all the control signal time slots are later than the uplink communication signal time slot, when reception time slot determining unit determines the reception time slot for receiving one of the control signals transmitted from the first base station.

8. The communication method according to claim 7, further comprising:
preferentially assigning, by the control equipment, a time slot other than a control signal time slot of a not-in-communication base station, which is used for transmitting a control signal of the second base station, to a communication signal time slot in which a radio terminal transmits/receives a communication signal including data to/from the base station, and
transmitting/receiving, by the radio terminal, the communication signal including data to the first base station using the communication signal time slot assigned by the control equipment.

9. The communication method according to claim 7, wherein
assigning, by the control equipment, the control signal time slot of the second base station to the communication signal time slot, when the assignment unit cannot assign the time slot other than the control signal time slot of the second base station, to the communication signal time slot, and
switching, by the radio terminal, the communication signal time slot to the time slot other than the control signal time slot of the second base station, when the radio terminal should receive the control signal of the second base station.

10. A radio communication system comprising:
a radio terminal;
a first base station that communicates with the radio terminal;
a second base station which is a handover destination of the radio terminal; and
a control equipment connected to the first base station and the second base station, wherein
the control equipment includes a transmission time slot determining unit configured to determine a plurality of control signal time slots and an uplink communication signal time slot, from among a plurality of time slots included in a frame,
the first base station includes a first control signal transmitter configured to transmit control signals by using the control signal time slots determined by the transmission time slot determining unit,
the second base station includes a second control signal transmitter configured to transmit control signals by using the control signal time slots determined by the transmission time slot determining unit,
the radio terminal includes,
a reception time slot determining unit configured to determine a reception time slot for receiving one of the control signals transmitted from the first base station, and determine a reception time slot for receiving one of the control signals transmitted from the second base station respectively, from among the control signal time slots determined by the transmission time slot determining unit;
a control signal receiver configured to receive the control signals transmitted from the first base station and the second base station respectively, based on a result of a determination by reception time slot determining unit, and
a communication signal transmitter configured to transmit communication signal including data to the first base station in the uplink communication signal time slot determined by the transmission time slot determining unit, wherein
the reception time slot determining unit determines a time slot which has a smallest time difference from the uplink communication signal time slot as the reception time slot for receiving one of the control signals transmitted from the second base station from among the control signal time slots which are later than the uplink communication signal time slot, if at least one of the control signal time slots are later than the uplink communication signal time slot, and determines a time slot which has a largest time difference from the uplink communication signal time slot as the reception time slot for receiving one of the control signals transmitted from the second base station from among the control signal time slots, if all the control signal time slots are earlier than the uplink communication signal time slot, when the reception time slot determining unit determines the reception time slot for receiving one of the control signals transmitted from the second base station.

11. A radio terminal comprising:
a reception time slot determining unit configured to determine a first reception time slot for receiving the control signal transmitted from the first base station using a plurality of control signal time slots included in a frame, and determine a second reception time slot for receiving the control signal transmitted from the second base station using the control signal time slots, from among the control signal time slots;
a control signal receiver configured to receive control signal transmitted from the first base station using the first reception time slot determined by reception time slot determining unit, and receive the control signal transmitted from the second base station using the second reception time slot determined by reception time slot determining unit; and
a communication signal transmitter configured to transmit communication signal including data to the base station in the uplink communication signal time slot other than the control signal time slots, wherein
the first base station is communicating with the radio terminal, the second base station is a handover destination of the radio terminal, and
the reception time slot determining unit determines a time slot which has a smallest time difference from the uplink communication signal time slot as the reception time slot for receiving one of the control signals transmitted from the second base station from among the control signal time slots which are later than the uplink communication signal time slot, if at least one of the control signal time slots are later than the uplink communication signal time slot, and determines a time slot which has a largest time difference from the uplink communication signal time slot as the reception time slot for receiving one of the control signals transmitted from the second base station from among the control signal time slots, if all the control signal time slots are earlier than the uplink communication signal time slot, when the reception time slot determining unit determines the reception time slot for receiving one of the control signals transmitted from the second base station.

12. A communication method comprising:
determining by a control equipment a plurality of control signal time slots and an uplink communication signal time slot, from among a plurality of time slots included in one frame;
transmitting by a first base station control signals to a radio terminal by using the control signal time slots determined by the control equipment;
transmitting by a second base station control signals to the radio terminal by using the control signal time slots determined by the control equipment;
determining by the radio terminal a reception time slot for receiving one of the control signals transmitted from the first base station, and determine a reception time slot for receiving one of the control signals transmitted from the second base station respectively, from among the control signal time slots determined by the control equipment;
receiving by the radio terminal the control signals transmitted from the first base station and the second base station respectively, based on a result of a determination; and
transmitting by the radio terminal a communication signal including data to the base station in the uplink communication signal time slot determined by the control equipment,
wherein the step of determining includes determining by the radio terminal a control signal time slot which has a smallest time difference from the uplink communication signal time slot as the reception time slot for receiving one of the control signals transmitted from the second base station from among the control signal time slots which are later than the uplink communication signal time slot, if at least one of the control signal time slots are later than the uplink communication signal time slot, and determining a time slot which has a largest time difference from the uplink communication signal time slot as the reception time slot for receiving one of the control signals transmitted from the second base station from among the control signal time slots, if all the control signal time slots are earlier than the uplink communication signal time slot, when determining the reception time slot for receiving one of the control signals transmitted from the first base station.

13. A communication method according to claim 12, further comprising the steps of:

preferentially assigning by the control equipment a time slot other than a control signal time slot of a not-in-communication base station, which is used for transmitting a control signal of the second base station, to a communication signal time slot in which a radio terminal transmits/receives a communication signal including data to/from the first base station; and transmitting/receiving by the radio terminal the communication signal including data to the first base station using the communication signal time slot assigned by the control equipment.

14. The communication method according to claim 12, further comprising the steps of:

assigning by the control equipment the control signal time slot of the not-in-communication base station to the communication signal time slot, when the assignment unit cannot assign the time slot other than the control signal time slot of the not-in-communication base station, to the communication signal time slot; and switching by the radio terminal the communication signal time slot to the time slot other than the control signal time slot of the not-in-communication base station, when the radio terminal should receive the control signal of the second base station.

* * * * *